(12) United States Patent
Ahmed et al.

(10) Patent No.: US 9,550,447 B2
(45) Date of Patent: Jan. 24, 2017

(54) HEADLAMP RETAINING BRACKET ASSEMBLY

(71) Applicant: FORD GLOBAL TECHNOLOGIES, LLC, Dearborn, MI (US)

(72) Inventors: Mustafa Ahmed, Canton, MI (US); Ian Dupret, Farmington Hills, MI (US); Thejaswi Prabhakar, Westland, MI (US); William Moore Sherwood, Royal Oak, MI (US); Sara E. Veyo, Canton, MI (US); Ray Hari Manala Rethinam, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 14/298,023

(22) Filed: Jun. 6, 2014

(65) Prior Publication Data

US 2015/0353002 A1    Dec. 10, 2015

(51) Int. Cl.
*B60Q 1/04* (2006.01)
*B62D 25/16* (2006.01)
*B62D 25/08* (2006.01)

(52) U.S. Cl.
CPC ........... *B60Q 1/0483* (2013.01); *B60Q 1/0408* (2013.01); *B60Q 1/0491* (2013.01); *B62D 25/085* (2013.01); *B62D 25/16* (2013.01)

(58) Field of Classification Search
CPC ....... B62D 27/02; B62D 65/16; B62D 25/163; B62D 25/085; B62D 25/16; B60Q 1/0491; B60Q 1/0483; B60Q 1/0408

USPC ............... 296/187.09, 187.04, 198
See application file for complete search history.

(56) References Cited

U.S. PATENT DOCUMENTS

| | | | | |
|---|---|---|---|---|
| 6,951,365 B2 * | 10/2005 | Chase | ...................... | B60Q 1/00 296/187.03 |
| 6,997,585 B2 * | 2/2006 | Ito | ................................. | 362/507 |
| 7,878,579 B2 * | 2/2011 | Yoshino et al. | .............. | 296/198 |
| 8,287,036 B2 * | 10/2012 | Nakaura | ................ | B60K 11/08 293/133 |
| 8,454,211 B2 | 6/2013 | Todaka et al. | | |

FOREIGN PATENT DOCUMENTS

| DE | 102012005496 A1 | 11/2012 |
|---|---|---|
| JP | 2006027488 A | 2/2006 |
| JP | 2009248841 A | 10/2009 |

* cited by examiner

*Primary Examiner* — Joseph D Pape
*Assistant Examiner* — Dana Ivey
(74) *Attorney, Agent, or Firm* — Frank A. MacKenzie; Brooks Kushman P.C.

(57) ABSTRACT

A vehicle assembly includes a front end module, an upper panel, and a fender covering the upper panel. The vehicle assembly also includes a housing, mounted to the front end module, having a first contour, and a bracket, having a second contour complementary with the first contour, attached with the housing. The bracket generally maintains a position of the headlamp assembly relative to the upper panel during a RCAR Low Speed Structural Crash Test Protocol (Issue 2.2).

17 Claims, 3 Drawing Sheets

HEADLAMP RETAINING BRACKET ASSEMBLY

TECHNICAL FIELD

The present application relates to a bracket for a vehicle headlamp assembly.

BACKGROUND

In order to sufficiently retain a vehicle headlamp assembly, brackets are used to mount the vehicle headlamp assembly directly with a front end module. These brackets help to maintain vehicle headlamp assembly position during an impact event. By tying the vehicle headlamp assembly directly to the front end module of the vehicle, the load generated from the force of the impact event on the headlamp assembly is transferred to the front end module.

SUMMARY

A vehicle comprises a front end module including a headlamp assembly, a front end sheet metal structure, including an upper welded panel, attached with the front end module, and a fender panel covering the upper welded panel and a corner of the headlamp assembly. The vehicle further comprises a bracket attached to the upper welded panel, spaced away from a surface of the headlamp assembly, and configured to generally maintain a position of the headlamp assembly relative to the front end sheet metal structure during a RCAR Low Speed Structural Crash Test Protocol (Issue 2.2) to minimize creasing of the fender panel.

A front end of a vehicle comprises a front end module, a sheet metal structure, including an upper welded panel, attached with the front end module, a headlamp housing, having a first contour, mounted to the front end module, and a fender panel covering the upper welded panel and a corner of the headlamp housing. The front end further comprises a bracket having a second contour complementary to the first contour, attached to the upper welded panel, and configured to generally maintain a position of the headlamp housing relative to the front end sheet metal structure during a RCAR Low Speed Structural Crash Test Protocol (Issue 2.2) to minimize creasing of the fender panel.

A vehicle assembly comprises a front end module (FEM), an upper panel, and a fender covering the upper panel. The assembly further comprises a housing, mounted to the FEM, having a first contour, and a bracket, having a second contour complementary with the first contour, attached with the housing, and configured to generally maintain a position of the headlamp assembly relative to the upper panel during a RCAR Low Speed Structural Crash Test Protocol (Issue 2.2).

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following disclosure was developed in response to criteria set forth by the Research Council for Automobile Repairs (hereinafter "RCAR"). The test, definitions, criteria, and procedures for "RCAR low speed structural crash test protocol, issue 2.2," published July 2011, are incorporated herein by reference. Specifically, the rotational or translational movement of the headlamp is tested when a barrier contacts the inboard side of the vehicle. The impact with the barrier causes the headlamp to move along the vehicle x-axis and y-axis as well as to rotate about the vehicle z-axis. This may cause the fender panel to crease. Further, this type of movement may cause the fender to contact the door.

Figure 1:
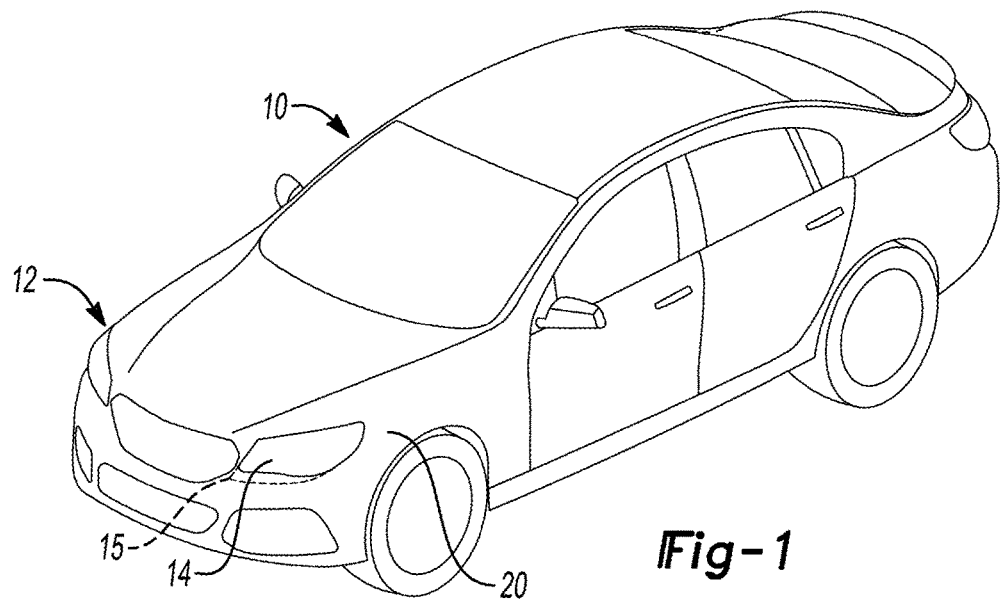
FIG. 1 is a perspective view of an automotive vehicle.

Referring to FIG. 1, a perspective view of a vehicle 10 having a front end module 12 including a headlamp assembly 14 is shown. The front end module is attached with a front end sheet metal structure 16. The front end sheet metal structure 16 includes an upper welded panel 18. A bolt-on fender panel 20 covers the upper welded panel 18 and a corner 15 of the headlamp assembly 14. A bracket 22, attached to the upper welded panel 18, further aids in preventing headlamp assembly rotation toward the fender panel 20. This further minimizes deformation of the fender panel 20.

Configured to further minimize creasing of the fender panel 20, the bracket 22 generally maintains the position of the headlamp assembly 14 relative to the front end sheet metal structure 16. The bracket 22 distributes the load of the force generated from the low-speed impact as described in the RCAR criteria.

Instead of pushing against the fender panel 20, the headlamp assembly 14 rotates into the bracket 22. This allows the bracket 22 to prevent the headlamp assembly 14 from contacting or deforming the fender panel 20. Preventing rotation of the headlamp assembly 14 allows the bracket 22 to distribute the load across the upper welded panel 18. This further eliminates kinking of the fender panel 20 and allows the bracket 22 to act as a capture bracket, minimizing the headlamp assembly 14 from moving along the vehicle x-axis and y-axis or from rotating in the vehicle z-axis.

As the headlamp assembly 14 rotates into the bracket 22, the load generated from the low-speed impact is transferred to the upper welded panel 18. The rotational force generated by the collision creates a load on the bracket 22. Instead of rotating into the bolt-on fender panel 20 and causing visible deformation of the bolt-on fender panel 20, the force is exerted on the upper welded panel 18 through the bracket 22. Therefore, the bracket 22 may be composed of a high-strength material. For example, the bracket 22 may be composed of ultra-high-strength steel. This will allow the bracket 22 sufficient strength to transfer the headlamp loading generated by the low-speed impact to the upper welded panel 18. This may reduce unfavorable observations on the predictive impact assessment required for desirable RCAR rating.

Figure 2:
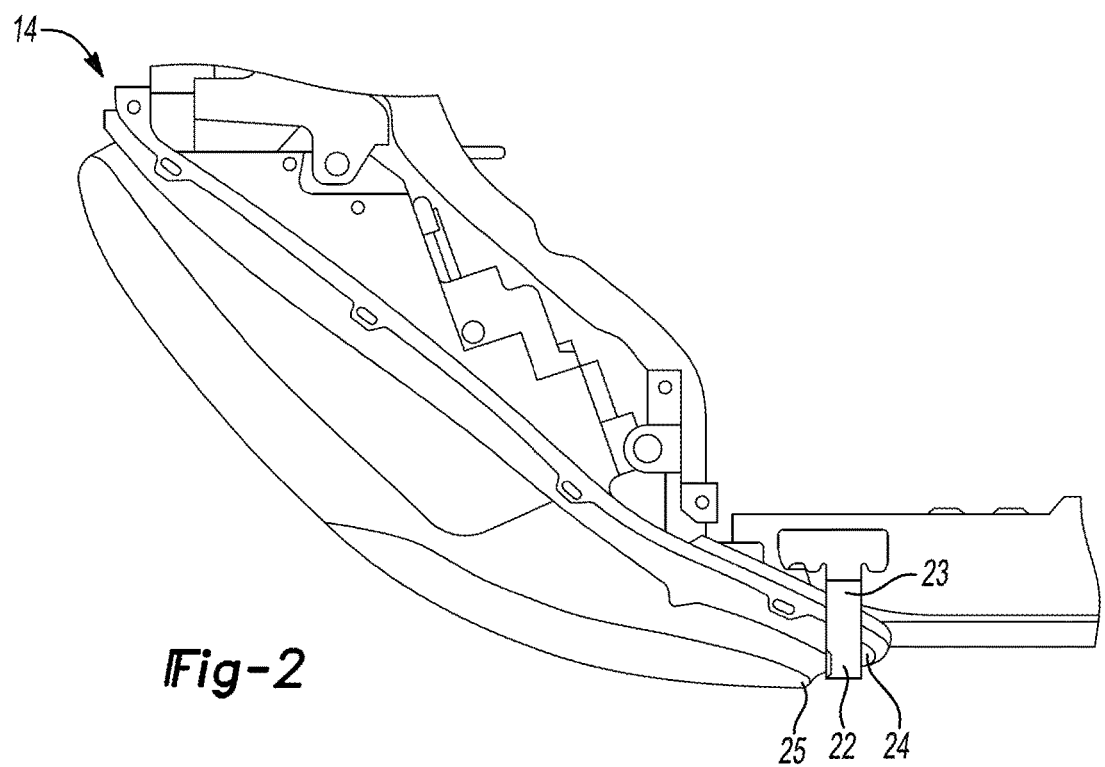
FIG. 2 is a top view of a bracket attached to an upper welded panel.

Referring to FIG. 2, a top view of the headlamp assembly 14 being captured by the bracket 22 is shown. The headlamp assembly 14 is included with the front end module 12 and is disposed at a distance spaced away from the bracket 22. The bracket 22 is shown extending around the surface 24 of the headlamp assembly 14. As shown in FIG. 2, the headlamp assembly 14 may not directly contact the bracket 22 before an impact. However, contact between the surface 24 of the headlamp assembly 14 and the bracket 22 may be made after an impact. Therefore, the bracket 22 may also be configured in a way such that a contour 23 of the bracket 22, after making contact with the surface 24 of the headlamp assembly 14, retains the headlamp assembly 14.

Having the surface 24 of the headlamp assembly 14 spaced away from the bracket 22 may be a specified requirement as it allows the headlamp assembly 14 the required amount of translational movement along the x-axis and y-axis of the vehicle 10, and rotational movement about the z-axis of the vehicle 10. Therefore, the bracket 22 may be configured to maintain the headlamp assembly 14 after a low-speed impact event and to impede the rotational movement of the headlamp assembly 14 toward the bolt-on fender panel 20. The contour 23 of the bracket 22 may complement a contour 25 of the headlamp assembly 14. By complementing the contour 25 of the headlamp assembly 14, the bracket 22 may be further able to manage the load generated by the low-speed impact event and reduce cross-car displacement of the headlamp assembly 14.

Figure 3:
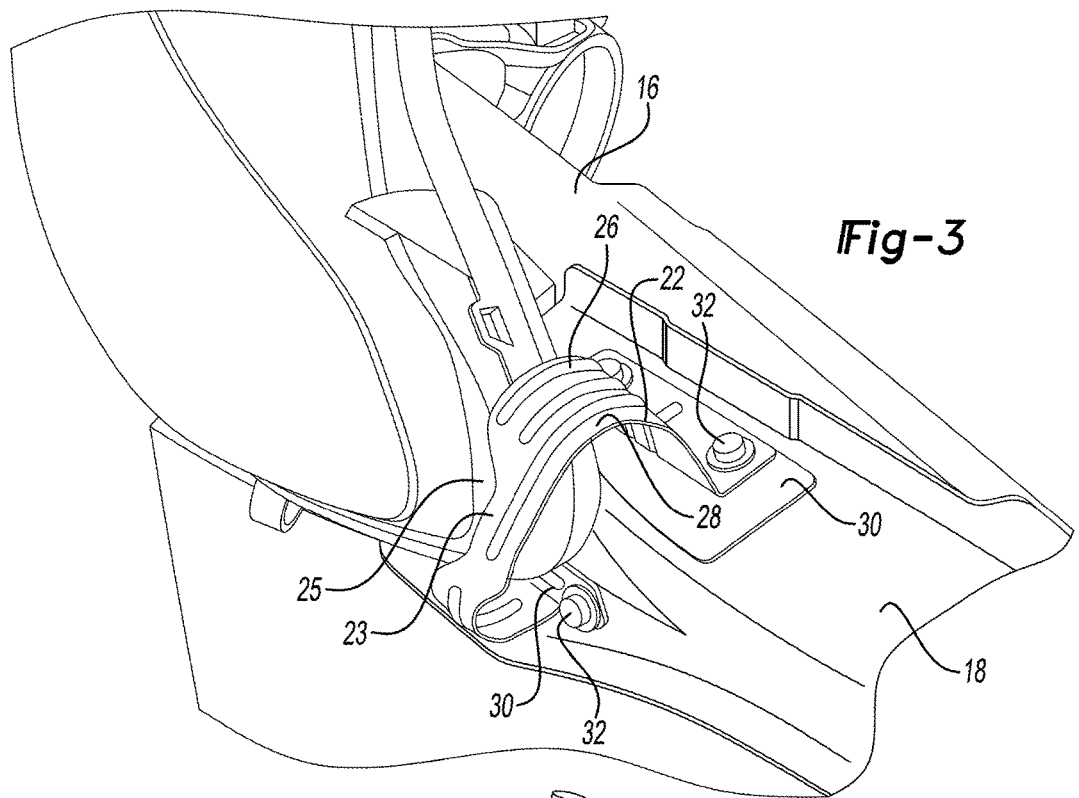
FIG. 3 is a partial perspective view of the bracket attached to the upper welded panel relative to the headlamp assembly.

Referring to FIG. 3, a perspective view of the bracket 22 of FIG. 2 is shown. The bracket 22 may be disposed behind the fender panel 20 and attached to the upper welded panel 18. The bracket 22 wraps around the headlamp assembly 14. The bracket 22 may further include a plurality of beads 26. The plurality of beads 26 extend across an intermediary segment 28.

The plurality of beads 26 may be formed on the intermediary segment 28. The plurality of beads 26 acts as a reinforcement that allows the bracket 22 to maintain the position of the headlamp assembly 14. Further, the plurality of beads 26 may help the bracket to more evenly distribute the load generated from the force of the impact. The plurality of beads 26 strengthen the intermediary segment 28 allowing the load from the force of the impact to transfer to at least two attachment portions 30. The at least two attachment portions 30 then distribute the load to at least two attachment positions 32.

The at least two attachment portions 30 are fastened to the upper welded panel 18. The at least two attachment portions 30 may have a contour that conforms to the contour of the upper welded panel 18. This may include attachment at the at least two attachment positions 32 through the use of a mechanical fastener, such as a rivet or a screw, or through bolting, welding, or an adhesive. The at least two attachment positions 32 may vary on the upper welded panel 18 in order to distribute the load generated from the force of the impact across the upper welded panel 18 without damaging the upper welded panel 18.

Figure 4:
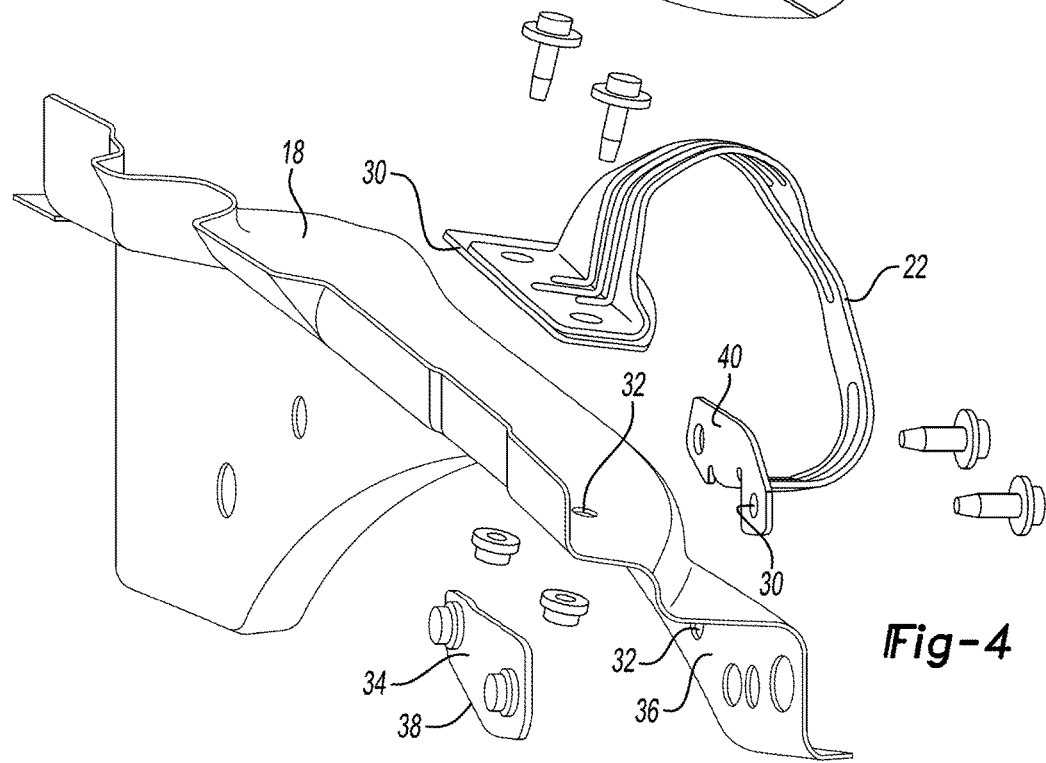
FIG. 4 is an exploded perspective view of the bracket attached to the upper welded panel.

Referring to FIG. 4, an exploded perspective view of the bracket 22 at the attachment positions 32 is shown. FIG. 4 shows an embodiment in which the at least two attachment portions 30 are bolted at the at least two attachment positions 32 on the upper welded panel 18. However as stated above, other methods of fastening may also be considered. The bracket 22 may further include a reinforcement member 34. The reinforcement member 34 may be used at any of the attachment positions 32 and is configured to further support the upper welded panel 18 to reduce damage caused by the transfer of the load from the force generated by the impact.

The reinforcement member 34 is disposed on a complementary surface 36 to either of the attachment portions 30 on the upper welded panel 18. The reinforcement member 34 may therefore have a contour 38 complementary to a contour 40 of the attachment portion 30. The reinforcement member 34 may be attached to the upper welded panel 18 using any joining, bonding, or fastening configuration and is further configured to receive any fastening device of the attachment portion 30.

Figure 5:
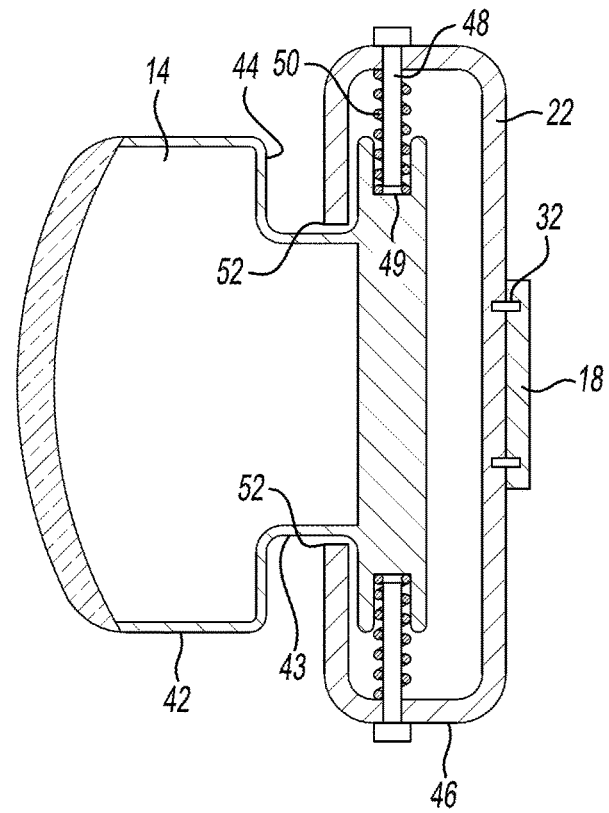
FIGS. 5 and 6 are side views, in cross section, of brackets and headlamp assemblies.

Referring to FIG. 5, a top view of a further embodiment of the present disclosure is shown. The headlamp assembly 14 further includes a headlamp housing 42. The headlamp housing 42 is mounted to the front end module 12. Further, the headlamp housing 42 may be formed having a first contour 44. The first contour 44 of the headlamp housing 42 may define a substantial U-shaped groove 43. The first contour 44, being generally U-shaped, may be tapered to provide a seat for the bracket 22. The first contour 44 has a depth and a width such that it may further restrict y-axis translational movement of the headlamp assembly 14. The bracket 22 further aids to restrict more than 3 mm of y-axis translational movement.

The bracket 22, attached to the upper welded panel 18 at the at least two attachment positions 32 as described above, may be formed having a second contour 46 complementary to the first contour 44 of the headlamp housing 42. The upper welded panel 18 provides a rigid support for the bracket 22. In this embodiment, the bracket 22 may define a general C-shape. The general C-shape of the bracket 22 terminates at two terminal ends 52. The terminal ends 52 of the bracket 22 slide into and are seated within the tapered U-groove 43 of the first contour 44 of the headlamp housing 42. Being seated within the groove 43 of the first contour 44 of the headlamp housing 42 allows the bracket 22 to provide clearance for some translational movement but restricts motion that may damage the fender panel 20. After a low-speed impact event has occurred, the terminal ends 52 of the general C-shaped bracket 22 engage the tapered groove 43 restricting x-axis and y-axis translational movement as well as z-axis rotational movement.

A pin 48 attaches the headlamp housing 42 to the bracket 22. This further prevents y-axis displacement of the headlamp assembly 14. The pin 48 locks into the first contour 44 of the headlamp housing 42 by fitting into a hole 49 defined on the first contour 44 of the headlamp housing 42. The pin 48 may further serve as a secondary pivot point for the headlamp assembly rotation. This allows free displacement of the headlamp assembly 14 along the x-axis while still restricting z-axis rotation towards the fender panel 20. The pin 48 may further include a biasing member 50. The biasing member 50 may be disposed between the bracket 22 and the headlamp housing 42. The biasing member 50 further supports the pin 48, restricting y-axis translational movement. After an impact, as the headlamp assembly 14 is displaced, the biasing member 50 compresses acting opposite the direction of the impact force. The biasing member 50 pushes the headlamp assembly 14 opposite the direction of the impact force.

Figure 6:
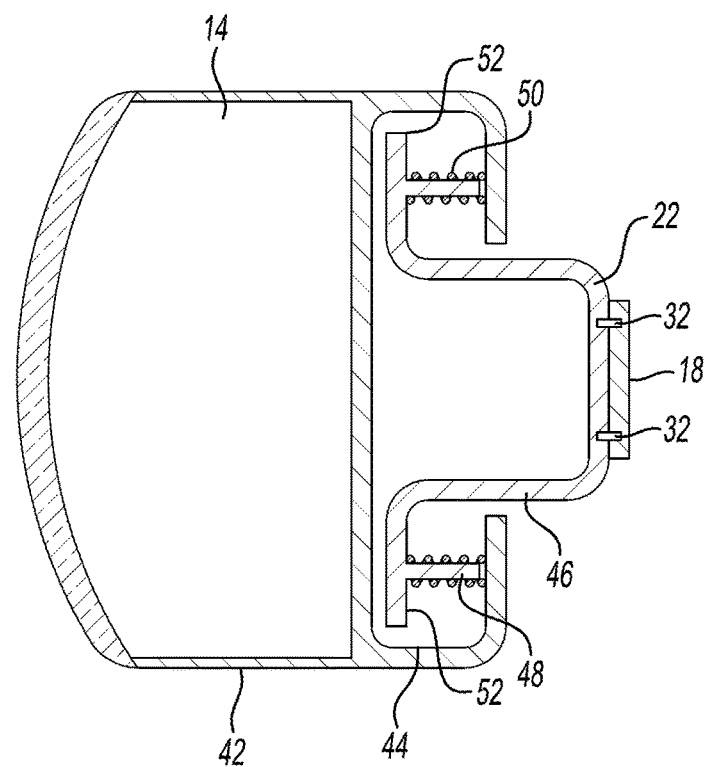

Referring to FIG. 6, a further embodiment of the bracket 22 of the present disclosure is shown. The headlamp assembly 14 includes a headlamp housing 42 having a first contour 44. The first contour 44 of the headlamp housing 42 defines a general C-shape. Likewise the bracket 22 is formed having a complementary second contour 46. In this embodiment, the bracket 22 has two terminal ends 52 fitting within the first contour 44 of the headlamp housing 42.

The first contour 44 of the headlamp housing 42 is such that the headlamp housing 42 is formed around the two ends 52 of the bracket 22. The bracket 22 is attached to and supported by the upper welded panel 18 at the at least two attachment positions 32 described above. Further, the pin 48 attaches the bracket 22 to the housing 42 and further prevents displacement of the headlamp assembly 14 as described above. The bracket 22 is further configured to generally maintain the position of the headlamp assembly 14 relative to the upper welded panel 18 to minimize creasing of the fender panel 20.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a front end module including a headlamp assembly;
    a front end sheet metal structure, including an upper welded panel, attached with the front end module; and
    a bracket attached to the upper welded panel, extending around and spaced away from a surface of the headlamp assembly such that the bracket is configured to partially enclose the surface of the headlamp assembly and generally maintain a headlamp assembly position relative to the front end sheet metal structure in an event of an impact.

2. The vehicle of claim 1, further comprising a reinforcement member attached to the front end sheet metal structure and configured to fasten the bracket to the upper welded panel.

3. The vehicle of claim 1, wherein the bracket minimizes creasing of a fender panel by preventing the headlamp assembly from rotating toward the fender panel.

4. The vehicle of claim 1 wherein the bracket further comprises a plurality of reinforcement beads formed on the bracket.

5. The vehicle of claim 1, wherein the bracket is shaped to conform to a contour of the surface of the headlamp assembly.

6. A vehicle front end comprising:
    a front end module;
    an upper welded panel attached with the front end module;
    a headlamp assembly mounted to the front end module;
    a fender panel covering the upper welded panel and a corner of the headlamp assembly; and
    a bracket that extends around a surface of the corner of the headlamp assembly to partially enclose the corner of the headlamp assembly, and is attached to the upper welded panel.

7. The front end of claim 6, wherein the bracket is generally C-shaped.

8. The front end of claim 6, wherein the bracket is welded to the upper welded panel.

9. The front end of claim 6, wherein the bracket is bolted to the upper welded panel.

10. The front end of claim 6, wherein the bracket is attached using adhesive to the upper welded panel.

11. The front end of claim 6, further comprising a pin attaching the bracket to the headlamp housing.

12. The front end of claim 11, wherein the pin is biased by a biasing member to prevent rotation of the headlamp housing toward the fender panel.

13. A vehicle headlamp assembly comprising:
    a front end module, an upper panel, and a fender covering the upper panel;
    a housing mounted to the front end module; and
    a bracket that wraps around the housing underneath the fender and is attached to the upper panel such that the bracket is configured to partially enclose a corner of the housing and maintain a position of the housing relative to the upper panel amid an impact to minimize creasing of the fender.

14. The vehicle assembly of claim 13, wherein a first contour of the housing defines a general C-shape.

15. The vehicle assembly of claim 13, wherein a second contour of the housing defines a general U-shape.

16. The vehicle assembly of claim 13, further comprising a pin attaching the bracket to the housing.

17. The vehicle assembly of claim 16, wherein the pin is biased by a biasing member to prevent rotation of the housing toward the fender.

* * * * *